(12) United States Patent
Wang et al.

(10) Patent No.: US 7,544,740 B2
(45) Date of Patent: *Jun. 9, 2009

(54) MULTI-LAYER NANO-PARTICLE PREPARATION AND APPLICATIONS

(75) Inventors: Xiaorong Wang, Hudson, OH (US); Victor J. Foltz, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 11/058,156

(22) Filed: Feb. 15, 2005

(65) Prior Publication Data

US 2005/0197462 A1    Sep. 8, 2005

Related U.S. Application Data

(60) Division of application No. 10/331,841, filed on Dec. 30, 2002, now Pat. No. 6,872,785, which is a continuation-in-part of application No. 10/223,393, filed on Aug. 19, 2002, now Pat. No. 6,956,084, which is a continuation-in-part of application No. 10/038,748, filed on Dec. 31, 2001, now Pat. No. 6,689,469, and a continuation-in-part of application No. 09/970,830, filed on Oct. 4, 2001, now Pat. No. 6,437,050.

(51) Int. Cl.
*C08L 33/04* (2006.01)
(52) U.S. Cl. .............. 525/94; 525/95; 525/99; 525/313; 525/314; 525/329.2; 525/330.3; 525/330.6; 525/332.2; 525/332.9; 525/338; 525/339
(58) Field of Classification Search .......... 525/94, 525/95, 99, 313, 314, 329.2, 330.3, 330.6, 525/332.2, 332.9, 338, 339
See application file for complete search history.

(56) References Cited

U.S. PATENT DOCUMENTS

| | | | |
|---|---|---|---|
| 2,531,396 A | 11/1950 | Carter et al. |
| 3,598,884 A | 8/1971 | Wei |
| 3,793,402 A | 2/1974 | Owens |
| 3,840,620 A | 10/1974 | Gallagher |
| 3,972,963 A | 8/1976 | Schwab et al. |
| 4,233,409 A | 11/1980 | Bulkley |
| 4,247,434 A | 1/1981 | Vanderhoff et al. |
| 4,326,008 A | 4/1982 | Rembaum |
| 4,386,125 A | 5/1983 | Shiraki et al. |
| 4,463,129 A | 7/1984 | Shinada et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fluwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 4,970,009 A | 11/1990 | Van Zon et al. |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawakubo et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |

(Continued)

FOREIGN PATENT DOCUMENTS

CA    2127919    3/1995

(Continued)

OTHER PUBLICATIONS

Formation of Worm-like Micelles from a Polystyrene-Polybutadiene-Polystyrene Block Copolymer in Ethyl Acetate, Canham et al., J.C.S. Faraday I, 1980, 76, 1857-1867.

(Continued)

*Primary Examiner*—Bernard Lipman
(74) *Attorney, Agent, or Firm*—Nathan T. Lewis; Meredith E. Hooker

(57) ABSTRACT

A multi-layer nano-particle composition including a polymer core and at least two additional layers is provided. The nano-particles have a mean average diameter less than about 100 nm. The nano-particles can be modified via, for example, hydrogenation or functionalization. The nano-particles can be advantageously incorporated into rubbers, elastomers, and thermoplastics.

25 Claims, 4 Drawing Sheets

U.S. PATENT DOCUMENTS

| | | | |
|---|---|---|---|
| 5,237,015 A | 8/1993 | Urban | |
| 5,241,008 A | 8/1993 | Hall | |
| 5,247,021 A | 9/1993 | Fujisawa et al. | |
| 5,256,736 A | 10/1993 | Trepka et al. | |
| 5,262,502 A | 11/1993 | Fujisawa et al. | |
| 5,290,873 A | 3/1994 | Noda et al. | |
| 5,290,875 A | 3/1994 | Moczygemba et al. | |
| 5,290,878 A | 3/1994 | Yamamoto et al. | |
| 5,329,005 A | 7/1994 | Lawson et al. | |
| 5,331,035 A | 7/1994 | Hall | |
| 5,336,712 A | 8/1994 | Austgen, Jr. et al. | |
| 5,362,794 A | 11/1994 | Inui et al. | |
| 5,395,891 A | 3/1995 | Obrecht et al. | |
| 5,395,902 A | 3/1995 | Hall | |
| 5,399,628 A | 3/1995 | Moczygemba et al. | |
| 5,399,629 A | 3/1995 | Coolbaugh et al. | |
| 5,405,903 A | 4/1995 | Van Westrenen et al. | |
| 5,421,866 A | 6/1995 | Stark-Kasley et al. | |
| 5,436,298 A | 7/1995 | Moczygemba et al. | |
| 5,438,103 A | 8/1995 | DePorter et al. | |
| 5,447,990 A | 9/1995 | Noda et al. | |
| 5,462,994 A | 10/1995 | Lo et al. | |
| 5,487,054 A | 1/1996 | Capps et al. | |
| 5,514,734 A | 5/1996 | Maxfield et al. | |
| 5,514,753 A | 5/1996 | Ozawa et al. | |
| 5,521,309 A | 5/1996 | Antkowiak et al. | |
| 5,525,639 A | 6/1996 | Keneko et al. | |
| 5,527,870 A | 6/1996 | Maeda et al. | |
| 5,530,052 A | 6/1996 | Takekoshi et al. | |
| 5,580,925 A | 12/1996 | Iwahara et al. | |
| 5,587,423 A | 12/1996 | Brandstetter et al. | |
| 5,594,072 A | 1/1997 | Handlin, Jr. et al. | |
| 5,614,579 A | 3/1997 | Roggeman et al. | |
| 5,627,252 A | 5/1997 | De La Croi Habimana | |
| 5,688,856 A | 11/1997 | Austgen, Jr. et al. | |
| 5,707,439 A | 1/1998 | Takekoshi et al. | |
| 5,728,791 A | 3/1998 | Tamai et al. | |
| 5,733,975 A | 3/1998 | Aoyama et al. | |
| 5,739,267 A | 4/1998 | Fujisawa et al. | |
| 5,742,118 A | 4/1998 | Endo et al. | |
| 5,763,551 A | 6/1998 | Wünsch et al. | |
| 5,773,521 A | 6/1998 | Hoxmeier et al. | |
| 5,777,037 A | 7/1998 | Yamanaka et al. | |
| 5,811,501 A | 9/1998 | Chiba et al. | |
| 5,834,563 A | 11/1998 | Kimura et al. | |
| 5,847,054 A | 12/1998 | McKee et al. | |
| 5,849,847 A | 12/1998 | Quirk | |
| 5,855,972 A | 1/1999 | Kaeding | |
| 5,883,173 A | 3/1999 | Elspass et al. | |
| 5,891,947 A | 4/1999 | Hall et al. | |
| 5,905,116 A | 5/1999 | Wang et al. | |
| 5,910,530 A | 6/1999 | Wang et al. | |
| 5,955,537 A | 9/1999 | Steininger et al. | |
| 5,986,010 A | 11/1999 | Clites et al. | |
| 5,994,468 A | 11/1999 | Wang et al. | |
| 6,011,116 A | 1/2000 | Aoyama et al. | |
| 6,020,446 A | 2/2000 | Okamoto et al. | |
| 6,025,416 A | 2/2000 | Proebster et al. | |
| 6,025,445 A | 2/2000 | Chiba et al. | |
| 6,060,549 A | 5/2000 | Li et al. | |
| 6,060,559 A | 5/2000 | Feng et al. | |
| 6,087,016 A | 7/2000 | Feeney et al. | |
| 6,087,456 A | 7/2000 | Sakaguchi et al. | |
| 6,106,953 A | 8/2000 | Zimmermann et al. | |
| 6,117,932 A | 9/2000 | Hasegawa et al. | |
| 6,121,379 A | 9/2000 | Yamanaka et al. | |
| 6,127,488 A | 10/2000 | Obrecht et al. | |
| 6,147,151 A | 11/2000 | Fukumoto et al. | |
| 6,180,693 B1 | 1/2001 | Tang et al. | |
| 6,191,217 B1 | 2/2001 | Wang et al. | |
| 6,197,849 B1 | 3/2001 | Zilg et al. | |
| 6,204,354 B1 | 3/2001 | Wang et al. | |
| 6,225,394 B1 | 5/2001 | Lan et al. | |
| 6,255,372 B1 | 7/2001 | Lin et al. | |
| 6,268,451 B1 | 7/2001 | Faust et al. | |
| 6,277,304 B1 | 8/2001 | Wei et al. | |
| 6,348,546 B2 | 2/2002 | Hiiro et al. | |
| 6,359,075 B1 | 3/2002 | Wollum et al. | |
| 6,379,791 B1 | 4/2002 | Cernohous et al. | |
| 6,383,500 B1 | 5/2002 | Wooley et al. | |
| 6,395,829 B1 | 5/2002 | Miyamoto et al. | |
| 6,420,486 B1 | 7/2002 | DePorter et al. | |
| 6,437,050 B1 | 8/2002 | Krom et al. | |
| 6,441,090 B1 | 8/2002 | Demirors et al. | |
| 6,448,353 B1 | 9/2002 | Nelson et al. | |
| 6,489,378 B1 | 12/2002 | Sosa et al. | |
| 6,524,595 B1 | 2/2003 | Perrier et al. | |
| 6,573,330 B1 | 6/2003 | Fujikake et al. | |
| 6,598,645 B1 | 7/2003 | Larson | |
| 6,649,702 B1 | 11/2003 | Rapoport et al. | |
| 6,663,960 B1 | 12/2003 | Murakami et al. | |
| 6,689,469 B2 | 2/2004 | Wang et al. | |
| 6,693,746 B1 | 2/2004 | Nakamura et al. | |
| 6,706,813 B2 | 3/2004 | Chiba et al. | |
| 6,706,823 B2 | 3/2004 | Wang et al. | |
| 6,727,311 B2 | 4/2004 | Ajbani et al. | |
| 6,737,486 B2 | 5/2004 | Wang | |
| 6,750,297 B2 | 6/2004 | Yeu et al. | |
| 6,759,464 B2 | 7/2004 | Ajbani et al. | |
| 6,774,185 B2 | 8/2004 | Lin et al. | |
| 6,777,500 B2 | 8/2004 | Lean et al. | |
| 6,780,937 B2 | 8/2004 | Castner | |
| 6,835,781 B2 | 12/2004 | Kondou et al. | |
| 6,858,665 B2 | 2/2005 | Larson | |
| 6,861,462 B2 | 3/2005 | Parker et al. | |
| 6,872,785 B2 | 3/2005 | Wang et al. | |
| 6,875,818 B2 | 4/2005 | Wang | |
| 6,908,958 B2 | 6/2005 | Maruyama et al. | |
| 6,956,084 B2 * | 10/2005 | Wang et al. | 525/313 |
| 7,071,246 B2 | 7/2006 | Xie et al. | |
| 7,112,369 B2 | 9/2006 | Wang et al. | |
| 7,179,864 B2 | 2/2007 | Wang | |
| 7,193,004 B2 | 3/2007 | Weydert et al. | |
| 7,205,370 B2 | 4/2007 | Wang et al. | |
| 7,217,775 B2 | 5/2007 | Castner | |
| 7,238,751 B2 | 7/2007 | Wang et al. | |
| 7,244,783 B2 | 7/2007 | Lean et al. | |
| 7,291,394 B2 | 11/2007 | Winkler et al. | |
| 7,347,237 B2 | 3/2008 | Xie et al. | |
| 7,408,005 B2 | 8/2008 | Zheng et al. | |
| 2001/0053813 A1 | 12/2001 | Konno et al. | |
| 2002/0007011 A1 | 1/2002 | Konno et al. | |
| 2002/0045714 A1 | 4/2002 | Tomalia et al. | |
| 2002/0095008 A1 | 7/2002 | Heimrich et al. | |
| 2002/0144401 A1 | 10/2002 | Nogueroles Vines et al. | |
| 2003/0004250 A1 | 1/2003 | Ajbani et al. | |
| 2003/0032710 A1 | 2/2003 | Larson | |
| 2003/0124353 A1 | 7/2003 | Wang et al. | |
| 2003/0130401 A1 | 7/2003 | Lin et al. | |
| 2003/0149185 A1 | 8/2003 | Wang et al. | |
| 2003/0198810 A1 | 10/2003 | Wang et al. | |
| 2003/0225190 A1 | 12/2003 | Borbely et al. | |
| 2004/0033345 A1 | 2/2004 | Dubertret et al. | |
| 2004/0059057 A1 | 3/2004 | Swisher et al. | |
| 2004/0001430 A1 | 7/2004 | Wang | |
| 2004/0127603 A1 | 7/2004 | Lean et al. | |
| 2004/0198917 A1 | 10/2004 | Castner | |
| 2005/0101743 A1 | 5/2005 | Stacy et al. | |
| 2005/0182158 A1 | 8/2005 | Ziser et al. | |
| 2005/0192408 A1 | 9/2005 | Lin et al. | |
| 2005/0203248 A1 | 9/2005 | Zheng et al. | |
| 2005/0215693 A1 | 9/2005 | Wang et al. | |
| 2005/0228074 A1 | 10/2005 | Wang et al. | |
| 2005/0282956 A1 | 12/2005 | Bohm et al. | |

| | | | |
|---|---|---|---|
| 2006/0084722 A1 | 4/2006 | Lin et al. | |
| 2006/0173115 A1 | 8/2006 | Wang et al. | |
| 2006/0173130 A1 | 8/2006 | Wang et al. | |
| 2006/0235128 A1 | 10/2006 | Bohm et al. | |
| 2007/0135579 A1 | 6/2007 | Obrecht et al. | |
| 2007/0142550 A1 | 6/2007 | Wang et al. | |
| 2007/0142559 A1 | 6/2007 | Wang et al. | |
| 2007/0149649 A1 | 6/2007 | Wang et al. | |
| 2007/0161754 A1 | 7/2007 | Bohm et al. | |
| 2007/0185273 A1 | 8/2007 | Hall et al. | |
| 2007/0196653 A1 | 8/2007 | Hall et al. | |
| 2008/0145660 A1 | 6/2008 | Wang et al. | |
| 2008/0149238 A1 | 6/2008 | Kleckner et al. | |
| 2008/0160305 A1 | 7/2008 | Wang et al. | |
| 2008/0286374 A1 | 11/2008 | Wang et al. | |

FOREIGN PATENT DOCUMENTS

| | | |
|---|---|---|
| DE | 3434983 | 4/1986 |
| DE | 4241538 | 6/1994 |
| EP | 143500 | 6/1985 |
| EP | 0255170 | 2/1988 |
| EP | 0 265 142 A2 | 4/1988 |
| EP | 265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0 590 491 A2 | 4/1994 |
| EP | 0742268 | 11/1996 |
| EP | 1031605 | 8/2000 |
| EP | 1 099 728 A1 | 5/2001 |
| EP | 1 134 251 A1 | 9/2001 |
| EP | 1273616 | 1/2003 |
| EP | 1321489 | 6/2003 |
| EP | 1783168 | 5/2007 |
| FR | 2099645 | 3/1972 |
| GB | 1575507 | 9/1980 |
| JP | 01279943 | 1/1989 |
| JP | 2191619 | 7/1990 |
| JP | 2196893 | 8/1990 |
| JP | 05132605 | 5/1993 |
| JP | 6248017 | 9/1994 |
| JP | 7011043 | 1/1995 |
| JP | 08-199062 | 8/1996 |
| JP | 2000-514791 | 11/2000 |
| JP | 0095640 | 4/2003 |
| JP | 2006-072283 | 3/2006 |
| JP | 2006-106596 | 4/2006 |
| JP | 2007-304409 | 11/2007 |
| WO | WO91/04992 | 4/1991 |
| WO | 9704029 | 2/1997 |
| WO | 9853000 | 11/1998 |
| WO | WO 01/87999 A2 | 11/2000 |
| WO | 0075226 | 12/2000 |
| WO | WO 02/31002 A1 | 4/2002 |
| WO | WO 02/081233 | 10/2002 |
| WO | WO 02/100936 | 12/2002 |
| WO | 03032061 | 4/2003 |
| WO | WO 03/085040 | 10/2003 |
| WO | WO2004/058874 | 7/2004 |
| WO | 2006069793 | 7/2006 |
| WO | 2008/079276 | 7/2008 |
| WO | 2008/079807 | 7/2008 |

OTHER PUBLICATIONS

Anomalous Behaviour of Solutions of Styrene-Butadiene Block Copolymers in Some Solvents, Tuzar et al., Makromol. Chem. 178, 22743-2746 (1977).
Association of Block Copolymers in Selective Solvents, 1 Measurements on Hydrogenated Poly(styrene-isoprene) in Decane and in trans-Decalin, Mandema et al., Makromol. Chem. 180, 1521-1538 (1979).
Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.
Greenwod, N.N.; Earnshaw, A., Chemistry of the Elements, pp. 1126-1127, Pergaroen Press, New York 1984.
Functionalized Core-Shell Polymers Prepared by Microemulsion Polymerization, E. Mendizabal et al., Dept. of Ingenieria Quimica, Unviv. De Guadalajara, MX, 477/ANTE 97/1733-1737.
Kink-Block and Gauche-Block Structures of Bimolecular Films, Gehard Lagaly, Chem. Int. Ed. Engl. vol. 15 (1976) No. 10, pp. 575-586.
Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.
Rheology of End-Tethered Polymer Layered Silicate Nanocomposites, R. Krishnamoorti et al., Macromol. 1997, 30, 4097-4102.
Rheology of Nanocomposites Based on Layered Silicates and Polyamide-12, B. Hoffman et al., Colloid Polm. Sci. 278:629-636 (2000).
Quatemary Ammonium Compounds, Encyclopedia of Chem Tech., 4th Ed. vol. 20, 1996, Wiley & Sons, pp. 739-767.
Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.
Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Wiley & Sons, Inc.
R.P. Quirk and S.C. Galvan, Macromolecules, 34, 1192-1197 (2001).
M. Moller, J.P. Spaz, A. Roescher, S. Mobmer, S.T. Selvan, H.A. Klok, Macromol. Symp. 117, 207-218 (1997).
T. Cosgrove, J.S. Phipps, R.M. Richardson, Macromolecules, 26, 4363-4367 (1993).
S. Mossmer, J.P. Spatz, M.Moller, T. Aberle, J. Schmidt, W. Burchard, Macromol. 33, 4791-4798 (2000).
Functionalized Core Shell Polymers Prepared by Microemulsion Polymerization,E. Mendizabal, J.E. Pugl, A. Aguiar, S. Gonzalez-Villegas, 477/Antec '97/1733-1737.
Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.
Super-Repellent Composite Fluoropolymer Surfaces, S.R. Coulson, I. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.
Transformation of a Simple Plastic into a Superhydrophobic Surface, H. Yildirim Erbil et al., Science vol. 299, Feb. 28, 2003, pp. 1377-1380.
Star Polymers by Immobilizing Functional Block Copolymers, by Koji Ishizu, Tokyo Institute of Technology, Meguro-ku, Tokyo, Japan, *Star and Hyperbranched Polymers*, 1999, ISBN 0-8247-1986-7.
Formation of Worm-like Micelles from a Polystyrene-Polybutadiene-Polystyrene Block Copolymer in Ethyl Acetate, Canham et al., J.C.S. Faraday I, 1980, 76, 1857-1867.
Anomalous Behaviour of Solutions of Styrene-Butadiene Block Copolymers in Some Solvents, Tuzar et al., Makromol. Chem. 178, 22743-2746 (1977).
Association of Block Copolymers in Selective Solvents, 1 Measurements on Hydrogenated Poly(styrene-isoprene) in Decane and in *trans*-Decalin, Mandema et al., Makromol. Chem. 180, 1521-1538 (1979).
Light-Scattering Studies of a Polystyrene-Poly(methyl methacrylate) Two-Block Copolymer in Mixed Solvents, Utiyama et al., Macromolecules vol. 7, No. 4, Jul.-Aug. 1974.
Reaction of Primary Aliphatic Amines with Maleic Anhydride, Lester E. Coleman et al., J. Org. Chem., 24, 185, 1959, pp. 135-136.

Synthesis, Thermal Properties and Gas Permeability of Poly (N-n-alkylmaleimide)s, A. Matsumoto et al., Polymer Journal vol. 23, No. 3, 1991, pp. 201-209.

Simultaneous TA and MS Analysis of Alternating Styrene-Malei Anhydride and Styrene-Maleimide Copolymers, Thermochim. Acta, 277, 14, 1996.

Synthesis and Photocrosslinking of Maleimide-Type Polymers, Woo-Sik Kim et al., Macromol. Rapid Commun., 17, 835, 1996, pp. 835-841.

Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.

Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.

Vulcanization Agents and Auxiliary Materials, Kirk-Othmer, Encyclopedia of Chemical Technology, 3rd Ed., Wiley Interscience, NY, 1982, vol. 22, pp. 390-403.

Dialkylimidazolium Chloroaluminate Melts: A New Class of Room-Temperature Ionic Liquids for Electrochemistry, Spectroscopy, and Synthesis. J.S. Wilkes, J.A. Levisky, B.A. Wilson, Inorg. Chem. 1982, 21, pp. 1263-1264.

Polymer-in-Ionic-Liquid Electrolytes C. Tiyapiboonchaiya, D.R. MacFarlane, J. Sun, M. Forsyth, Micromol. Chem. Phys., 2002, 203, pp. 1906-1911.

EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.

Structure of molten 1,3-dimethylimidazolium chloride using neutron diffraction.C. Hardacre, J.D. Holbrey, S.E. J. McMath, D.T. Bowron, A.K. Soper, J. Chem. Physics, 2003, 118(1), pp. 273-278.

Reverse Atom Transfer Radical Polymerization of Methyl Methacrylate in Room-Temperature Inoic Liqquids, H. Ma, X. Wan, X. Chen, Q-F. Zhou, J. Polym. Sci., A. Polym. Chem. 2003, 41, pp. 143-151.

Non-Debye Relaxations in Disordered Ionic Solids, W. Dieterich, P. Maass, Chem. Chys. 2002, 284, pp. 439-467.

Polymer Layered Silicate Nanocomposites, Giannelis E.P. Advanced Materials vol. 8, No. 1, Jan. 1, 1996, pp. 29-35.

A Review of Nanocomposites 2000, J.N. Hay, S. J. Shaw.

Recent Advances in Flame Retardant Polymer Nanocomposites, Tilman, J.W. et al., pp. 273-283, 2001.

"Dendrimers and Dendrons, Concept, Synthesis, Application", edited by Newkome G.R, Wiley-VCH, 2001, pp. 45, 191-310.

"Synthesis, Functionalization and Surface Treatment of Nanoparticles", edited by Baraton M-I, ASP (Am. Sci. Pub.), Stevenson Ranch, California, 2003, pp. 51-52, 174-208.

Akashi, Mitsuru et al., "Synthesis and Polymerization of a Styryl Terminated Oligovinylpyrrolidone Macromonomer", Die Angerwandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubolization of Metal Salts and Metal Colloids", Macromolecules, 29, pp. 380-3806 (1996).

Batzilla, Thomas et al., "Formation of intra-and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1996).

Bradley, John S., "The Chemistry of Transition Metal Colloids", Clusters and Colloids: From Theory to Applications, Chapter 6, Weinheim, VCH, pp. 459-544 (1994).

Bronstein, Lyudmila M. et al., "Synthesis of Pd-, Pt-, and Rh-containing polymers derived from polystyrene-polybutadiene block copolymers; micellization of block copolymers due to complexation", Macromol. Chem. Phys., 199, pp. 1357-1363 (1998).

Calderara, Frederic et al., "Synthesis of chromophore-labelled polystyrene/poly(ethylene oxide) diblock copolymers", Makromol. Chem., 194, pp. 1411-1420 (1993).

Chen, Ming-Qing et al., "Graft Copolymers Having Hydrophobic Backbone and Hydrophilic Branches. XXIII. Particle Size Control of Poly(ethylene glycol)-Coated Polystyrene Nanoparticles Prepared by Macromonomer Method", Journal of Polymer Science: Part A: Polymer Chemistry, vol. 37, pp. 2155-2166 (1999).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Garcia, Carlos B. et al., "Self-Assembly toward Magnetic Silica-Type Nanoparticles of Different Shapes from Reverse Block Copolymer Mesophases", J. Am. Chem. Soc., vol. 125, pp. 13310-13311 (2003).

Hamley, Ian W., "The Physics of Block Copolymers", Oxford Science Publication: Oxford, Chapters 3 and 4, pp. 131-265, (1998).

Ishizu, Koji et al., "Synthesis of Star Polymer with Nucleus of Microgel", Polymer Journal, vol. 12, No. 6, pp. 399-404 (1980).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mayer, A.B.R. et al., "Transition metal nanoparticles protected by amphiphilic block copolymers as tailored catalyst systems", Colloid Polym. Sci., 275, pp. 333-340 (1997).

Mi, Yongli et al., "Glass transition of nano-sized single chain globules", Polymer 43, Elsevier Science Ltd., pp. 6701-6705 (2002).

Nace, Vaughn M., "Nonionic Surfactants: Polyoxyalkylene Block Copolymers", Surfactant Science Series, vol. 60, pp. 1-266 (1996).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Piirma, Irja, "Polymeric Surfactants", Surfactant Science Series, vol. 42, pp. 1-289 (1992).

Price, Colin, "Colloidal Properties of Block Copolymers", Applied Science Publishers Ltd., Chapter 2, pp. 39-80 (1982).

Rager, Timo et al., "Micelle formation of poly(acrylic acid)-block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Riess, Gerard et al., "Block Copolymers", Encyclopedia of Polymer Science and Engineering, vol. 2, pp. 324-434 (1985).

Saito, Reiko et al., "Synthesis of Microspheres with Microphase-Separated Shells", Journal of Polymer Science: Part A: Polymer Chemistry, vol. 38, pp. 2090-2097 (2000).

Serizawa, Takeshi et al., "Transmisson Electron Microscopic Study of Cross-Sectional Morphologies of Core-Corona Polymeric Nanospheres", Macromolecules, 33, pp. 1759-1764 (2000).

Stepanek, Miroslav et al., "Time-Dependent Behavior of Block Polyelectrolyte Micelles in Aquenous Media Studied by Potentiometric Titrations, QELS and Fluroetry", Langmuir, vol. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Tsitsilianis, Constantinos et al., Makromol. Chem. 191, pp. 2319-2328 (1990).

Tuzar, Zdenek et al., "Micelles of Block and Graft Copolymers in Solutions", Surface and Colloid Science, vol. 15, Chapter 1, pp. 1-83 (1993).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Synthesis, Characterization, and Application of Novel Polymeric Nanoparticles", Macromolecules, 40, pp. 499-508 (2007).

Webber, Stephen E. et al., "Solvents and Self-Organization of Polymers", NATO ASI Series, Series E: Applied Sciences, vol. 327, pp. 1-509 (1996).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constucts Inspired from Biological Systems", Journal of Polymer Science: Part A: Polymer Chemistry, vol. 38, pp. 1397-1407 (2000).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Braun, Hartmut et al., "Enthalpic interaction of diblock copolymers with immiscible polymer blend components", Polymer Bulletin, vol. 32, pp. 241-248 (1994).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99.

Chen, Ming-Qing et al., "Nanosphere Formation in Copolymerization of Methyl Methacrylate with Poly(ethylene glycol) Macromonomers", Journal of Polymer Science Part A: Polymer Chemistry, vol. 38, pp. 1811-1817 (2000).

Ferreira, Paula G. et al., "Scaling Law for Entropic Effects at Interfaces between Grafted Layers and Polymer Melts", Macromolecules, vol. 31, pp. 3994-4003 (1998).

Gay, C., "Wetting of a Polymer Brush by a Chemically Identical Polymer Melt", Macromolecules, vol. 30, pp. 5939-5943 (1997).

Halperin, A., "Polymeric Micelles: A Star Model", Macromolecules, vol. 20, pp. 2943-2946 (1987).

Hasegawa, Ryuichi et al., "Optimum Graft Density for Dispersing Particles in Polymer Melts", Macromolecules, vol. 29, pp. 6656-6662 (1996).

Kraus, Gerard, "Mechanical Losses in Carbon-Black-Filled Rubbers", Journal of Applied Polymer Science: Applied Polymer Symposium, vol. 39, pp. 75-92 (1984).

Ligoure, Christian, "Adhesion between a Polymer Brush and a Elastomer: A Self-Consistent Mean Field Model", Macromolecules, vol. 29, pp, 5459-5468 (1996).

Matsen, M.W., "Phase Behavior of Block Copolymer/Homopolymer Blends", Macromolecules, vol. 28, pp. 5765-5773 (1995).

Milner, S.T. et al., "Theory of the Grafted Polymer Brush", Macromolecules, vol. 21, pp. 2610-2619 (1988).

Milner, S.T. et al., "End-Confirmed Polymers: Corrections to the Newtonian Limit", Macromolecules, vol. 22, pp. 489-490 (1989).

Noolandi, Jaan et al., "Theory of Block Copolymer Micelles in Solution", Macromolecules, vol. 16, pp. 1443-1448 (1983).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Shull, Kenneth R., "End-Adsorbed Polymer Brushes in High- and Low-Molecular-Weight Matrices", Macromolecules, vol. 29, pp. 2659-2666 (1996).

Whitmore, Mark Douglas et al., "Theory of Micelle Formation in Block Copolymer-Homopolymer Blends", Macromolecules, vol. 18, pp. 657-665.

Wijimans, C.M. et al., "Effect of Free Polymer on the Structure of a Polymer Brush and Interaction between Two Polymer Brushes", Macromolecules, vol. 27, pp. 3238-3248 (1994).

Witten, T.A. et al., "Stress Relaxation in the Lamellar Copolymer Mesophase", Macromolecules, vol. 23, pp. 824-829 (1990).

Worsfold, Denis J. et al., "Preparation et caracterisation de polymers-modele a structure en etoile , par copolymerisation sequencee anionique", Canadian Journal of Chemistry, vol. 47, pp. 3379-3385 (Mar. 20, 1969).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Saito, Reiko et al., "Core-Shell Type Polymer Microspheres Prepared From Poly(Styrene-b-Methacrylic Acid)-1. Synthesis of Microgel", Eur. Polym. J., vol. 27, No. 10, pp. 1153-1159 (1991).

Saito, Reiko et al., "Arm-number effect of core-shell type polymer microsphere: 1. Control of arm-number of microsphere", Polymer, vol. 35, No. 4, pp. 866-871 (1994).

Kralik, M. et al., "Catalysis by metal nanoparticles supported on functional organic polymers", Journal of Molecular Catalysis A: Chemical, vol. 177, pp. 113-138 [2001].

Bahadur, Pratap, "Block copolymers- Their microdomian formation (in solid state) and surfactant behaviour (in solution)", Current Science, vol. 80, No. 8, pp. 1002-1007, Apr. 25, 2001.

Guo, Andrews et al., "Star Polymers and Nanospheres from Cross-Linkable Diblock Copolymers", Macromolecules, vol. 29, pp. 2487-2493, Jan. 17, 1996.

Ishizu, Koji et al., "Core-Shell Type Polymer Microspheres Prepared from Black Copolumers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

O'Reilly, Rachel K. et al., "Cross-linked block copolymer micelles: functional nanostructures of great potential and versatility", Chem. Soc. Rev., vol. 35, pp. 1068-1083, Oct. 2, 2006.

Oranli, Levent et al., "Hydrodynamic studies on micellar solutions of styrene-butadiene block copolymers in selective solvents", Can. J. Chem., vol. 63, pp. 2691-2696, 1985.

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Riess, Gerard, "Micellization of block copolymers", Prog. Polym. Sci., vol. 28, pp. 1107-1170, Jan. 16, 2003.

Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.

Thurmond, K. Bruce et al., "Shell cross-linked polymer micelles: stabilized assemblies with great versatility and potential", Colloids and Surfaces B: Biointerfaces, vol. 16, pp. 45-54, 1999.

Wilson, D.J. et al., "Photochemical Stabilization of Block Copolymer Micelles", Eur. Polym. J., vol. 24, No. 7, pp. 617-621, 1988.

Ege, Seyhan, Organic Chemistry Structure and Reactivity, 3rd Edition, p. 959, 1994.

Oct. 20, 2005 Office Action from U.S. Appl. No. 11/104759 filed Apr. 13, 2005 (12 pp.).

Aug. 21, 2006 Final Office Action from U.S. Appl. No. 11/104759 filed Apr. 13, 2005 (14 pp.).

Dec. 22, 2006 Advisory Action from U.S. Appl. No. 11/104759 filed Apr. 13, 2005 (3 pp.).

May 16, 2007 Office Action from U.S. Appl. No. 11/104759 filed Apr. 13, 2005 (9 pp.).

Oct. 30, 2007 Final Office Action from U.S. Appl. No. 11/104759 filed Apr. 13, 2005 (11 pp.).

Sakurai, Ryo et al.,"68.2: Color and Flexible Electronic Paper Display using QR-LPD Technology", SID 06 Digest, pp. 1922-1925 (2006).

Asinovsky, Olga, Jun. 20, 2006 Office Action from U.S. Appl. No. 10/791,049 filed Mar. 2, 2004 (11 pp.).

Asinovsky, Olga, Dec. 22, 2006 Office Action from U.S. Appl. No. 10/791,049 filed Mar. 2, 2004 (11 pp.).

Asinovsky, Olga, Jun. 7, 2007 Office Action from U.S. Appl. No. 10/791,049 filed Mar. 2, 2004 (11 pp.).

Asinovsky, Olga, Nov. 28, 2007 Office Action from U.S. Appl. No. 10/791,049 filed Mar. 2, 2004 (9 pp.).

Asinovsky, Olga, May 21, 2008 Office Action from U.S. Appl. No. 10/791,049 filed Mar. 2, 2004 (11 pp.).

Asinovsky, Olga, Sep. 11, 2008 Office Action from U.S. Appl. No. 10/791,049 filed Mar. 2, 2004 (12 pp.).

Ronesi, Vickey M., Jan. 8, 2007 Office Action from U.S. Appl. No. 10/791,177 filed Mar. 2, 2004 (5 pp.).

Harlan, Robert D., May 3, 2007 Office Action from U.S. Appl. No. 10/791,177 filed Mar. 2, 2004 (6 pp.).

Harlan, Robert D., Oct. 18, 2007 Office Action from U.S. Appl. No. 10/791,177 filed Mar. 2, 2004 (6 pp.).

Harlan, Robert D., May 28, 2008 Office Action from U.S. Appl. No. 10/791,177 filed Mar. 2, 2004 (8 pp.).

Kiliman, Leszek B., Sep. 9, 2005 Office Action from U.S. Appl. No. 10/817,995 filed Apr. 5, 2004 (7 pp.).

Kiliman, Leszek B., Mar. 23, 2006 Office Action from U.S. Appl. No. 10/817,995 filed Apr. 5, 2004 (7 pp.).

Kiliman, Leszek B., Dec. 13, 2006 Office Action from U.S. Appl. No. 10/817,995 filed Apr. 5, 2004 (6 pp.).

Kiliman, Leszek B., Sep. 5, 2008 Office Action from U.S. Appl. No. 10/817,995 filed Apr. 5, 2004 (5 pp.).

Wyrozebski Lee, Katarzyna I., Dec. 19, 2006 Office Action from U.S. Appl. No. 10/872,731 filed Jun. 21, 2004 (6 pp.).

Wyrozebski Lee, Katarzyna I., Mar. 7, 2007 Office Action from U.S. Appl. No. 10/872,731 filed Jun. 21, 2004 (13 pp.).

Wyrozebski Lee, Katarzyna I., Sep. 14, 2007 Office Action from U.S. Appl. No. 10/872,731 filed Jun. 21, 2004 (9 pp.).

Chevalier, Alicia Ann, Sep. 6, 2006 Office Action from U.S. Appl. No. 10/886,283 filed Jul. 6, 2004 (5 pp.).

Chevalier, Alicia Ann, Jan. 4, 2007 Office Action from U.S. Appl. No. 10/886,283 filed Jul. 6, 2004 (8 pp.).

Chevalier, Alicia Ann, Jul. 2, 2007 Office Action from U.S. Appl. No. 10/886,283 filed Jul. 6, 2004 (8 pp.).

Chevalier, Alicia Ann, Jan. 4, 2008 Office Action from U.S. Appl. No. 10/886,283 filed Jul. 6, 2004 (8 pp.).

Mullis, Jeffrey C., Oct. 31, 2006 Office Action from U.S. Appl. No. 11/050,115 filed Feb. 3, 2005 (6 pp.).

Mullis, Jeffrey C., Mar. 24, 2008 Office Action from U.S. Appl. No. 11/050,115 filed Feb. 3, 2005 (10 pp.).

Mullis, Jeffrey C., Aug. 21, 2008 Office Action from U.S. Appl. No. 11/050,115 filed Feb. 3, 2005 (7 pp.).

Raza, Saira B., Oct. 20, 2005 Office Action from U.S. Appl. No. 11/104,759 filed Apr. 13, 2005 (10 pp.).

Raza, Saira B., Aug. 21, 2006 Office Action from U.S. Appl. No. 11/104,759 filed Apr. 13, 2005 (6 pp.).

Haider, Saira Bano, May 16, 2007 Office Action from U.S. Appl. No. 11/104,759 filed Apr, 13, 2005 (9 pp.).

Haider, Saira Bano, Oct. 30, 2007 Office Action from U.S. Appl. No. 11/104,759 filed Apr. 13, 2005 (9 pp.).

Haider, Saira Bano, Jun. 12, 2008 Office Action from U.S. Appl. No. 11/104,759 filed Apr. 13, 2005 (10 pp.).

Harlan, Robert D., Nov. 7, 2005 Office Action from U.S. Appl. No. 11/117,981 filed Apr. 29, 2005 (7 pp.).

Harlan, Robert D., Jul. 20, 2006 Office Action from U.S. Appl. No. 11/117,981 filed Apr. 29, 2005 (6 pp.).

Harlan, Robert D., Jan. 26, 2007 Office Action from U.S. Appl. No. 11/117,981 filed Apr. 29, 2005 (8 pp.).

Harlan, Robert D., Jul. 12, 2007 Office Action from U.S. Appl. No. 11/117,981 filed Apr. 29, 2005 (6 pp.).

Harlan, Robert D., Jan. 2, 2008 Office Action from U.S. Appl. No. 11/117,981 filed Apr. 29, 2005 (6 pp.).

Harlan, Robert D., Jul. 25, 2008 Office Action from U.S. Appl. No. 11/117,981 filed Apr. 29, 2005 (8 pp.).

Maksymonko, John M., Feb. 20, 2008 Office Action from U.S. Appl. No. 11/305,279 filed Dec. 16, 2005 (14 pp.).

Maksymonko, John M., Aug. 6, 2008 Office Action from U.S. Appl. No. 11/305,279 filed Dec. 16, 2005 (11 pp.).

Maksymonko, John M., Jul. 17, 2008 Office Action from U.S. Appl. No. 11/305,281 filed Dec. 16, 2005 (13 pp.).

Le, Hoa T., Sep. 25, 2008 Office Action from U.S. Appl. No. 11/612,554 filed Dec. 19, 2006 (8 pp.).

Maksymonko, John M., Jun. 13, 2008 Office Action from U.S. Appl. No. 11/641,514 filed Dec. 19, 2006 (7 pp.).

Mullis, Jeffrey C., Oct. 31, 2008 Office Action from U.S. Appl. No. 11/641,514 filed Dec. 19, 2006 (10 pp.).

Maksymonko, John M., Jun. 11, 2008 Office Action from U.S. Appl. No. 11/642,124 filed Dec. 20, 2006 (16 pp.).

Maksymonko, John M., May 30, 2008 Office Action from U.S. Appl. No. 11/642,795 filed Dec. 20, 2006 (12 pp.).

Maksymonko, John M., May 28, 2008 Office Action from U.S. Appl. No. 11/642,802 filed Dec. 20, 2006 (10 pp.).

Chen, Jizhuang, Dec. 30, 2005 Office Action from Chinese Patent Application No. 02819527.2 filed Oct. 4, 2002 (9 pp.).

Chen, Jizhuang, Dec. 21, 2007 Office Action from Chinese Patent Application No. 02819527.2 filed Oct. 4, 2002 (12 pp.).

Chen, Jizhuang, Sep. 26, 2008 Office Action from Chinese Patent Application No. 02819527.2 filed Oct. 4, 2002 (4 pp.).

Schutte, M., Aug. 8, 2006 Office Action from European Patent Application No. 02807196.7 filed Oct. 4, 2002 (5 pp.).

Schutte, Maya, Sep. 3, 2007 Office Action from European Patent Application No. 02807196.7 filed Oct. 4, 2002 (2 pp.).

Watanabe, Y., May 7, 2008 Office Action from Japanese Patent Application No. 582224/2003 filed Oct. 4, 2002 (5 pp.).

Watanabe, Y., Jul. 29, 2008 Office Action from Japanese Patent Application No. 582224/2003 filed Oct. 4, 2002 (17 pp.).

May 30, 2008 International Search Report from PCT Patent Application No. PCT/US2007/026031 filed Dec. 19, 2007 (4 pp.).

May 27, 2008 International Search Report from PCT Patent Application No. PCT/US2007/087869 filed Dec. 18, 2007 (4 pp.).

Aug. 25, 2008 International Search Report from PCT Patent Application No. PCT/US2008/068838 filed Jun. 30, 2008 (4 pp.).

Lipman, Bernard, Mar. 26, 2002 Notice of Allowance from U.S. Appl. No. 09/970,830 filed Oct. 4, 2001 (4 pp.).

Kiliman, Leszek B., Feb. 13, 2003 Office from U.S. Appl. No. 10/038,748 filed Dec. 31, 2001 (3 pp.).

Kiliman, Leszak B., Aug. 25, 2003 Notice of Allowance from U.S. Appl. No. 10/038,748 filed Dec. 31, 2001 (5 pp.).

Harlan, Robert D., Mar. 17, 2004 Restriction/Electron Office Action from U.S. Appl. No. 10/223,393 filed Aug. 19, 2002 (6 pp.).

Harlan, Robert D., Jun. 22, 2004 Office Action from U.S. Appl. No. 10/223,393 filed Aug. 19, 2002 (6 pp.).

Harlan, Robert D., Jan. 3, 2005 Notice of Allowance from U.S. Appl. No. 10/223,393 filed Aug. 19, 2002 (6 pp.).

Lipman, Bernard, Mar. 25, 2004 Restiction/Electron Office Action from U.S. Appl. No. 10/331,841 filed Dec. 30, 2002 (6 pp.).

Lipman, Bernard, Nov. 18, 2004 Notice of Allowance from U.S. Appl. No. 10/331,841 filed Dec. 30, 2002 (5 pp.).

Lipman, Bernard, Mar. 24, 2004 Restriction/Electron Office Action from the U.S. Appl. No. 10/345,498 filed Jan. 16, 2003 (5 pp.).

Lipman, Bernard, Nov. 23, 2004 Notice of Allowance from U.S. Appl. No. 10/345,498 filed Jan. 16, 2003 (5 pp.).

Choi, Ling Siu, Mar. 24, 2006 Office Action from U.S. Appl. No. 10/755,648 filed Jan. 12, 2004 (11 pp.).

Choi, Ling Siu, Dec. 4, 2006 Notice of Allowance from U.S. Appl. No. 10/755,648 filed Jan. 12, 2004 (9 pp.).

Asinovsky, Olga, Aug. 16, 2007 Advisory Action from U.S. Appl. No. 10/791,049 filed Mar. 2, 2004 (2 pp.).

Asinovsky, Olga, Jul. 29, 2008 Advisory Action from U.S. Appl. No. 10/791,049 filed Mar. 2, 2004 (3 pp.).

Harlan, Robert D., Jan. 9, 2008 Advisory Action from U.S. Appl. No. 10/791,177 filed Mar. 2, 2004 (3 pp.).

Harlan, Robert D., Mar. 7, 2008 Advisory Action from U.S. Appl. No. 10/791,177 filed Mar. 2, 2004 (3 pp.).

Le, Hoa T., Dec. 14, 2004 Office Action from U.S. Appl. No. 10/791,491 filed Mar. 2, 2004 (5 pp.).

Le, Hoa T., Jul. 5, 2005 Office Action from U.S. Appl. No. 10/791,491 filed Mar. 2, 2004 (9 pp.).

Le, Hoa T., Apr. 10, 2006 Notice of Allowance from U.S. Appl. No. 10/791,491 filed Mar. 2, 2004 (5 pp.).

Kiliman, Leszak B., May 15, 2007 Advisory Action from U.S. Appl. No. 10/817,995 filed Apr. 5, 2004 (2 pp.).

Kiliman, Leszak B., Apr. 2, 2008 Notice of Allowance from U.S. Appl. No. 10/817,995 filed Apr. 5, 2004 (5 pp.).

Mullis, Jeffrey C., Nov. 5, 2008 Advisory Action from U.S. Appl. No. 11/050,115 filed Feb. 3, 2005 (4 pp.).

Lipman, Bernard, Oct. 3, 2006 Notice of Allowance from U.S. Appl. No. 11/064,234 filed Feb. 22, 2005 (5 pp.).

Haider, Saira Bano, Dec. 22, 2006 Advisory Action from U.S. Appl. No. 11/104,759 filed Apr. 13, 2005 (3 pp.).

Haider, Saira Bano, Mar. 19, 2008 Advisory Action from U.S. Appl. No. 11/104,759 filed Apr. 13, 2005 (3 pp.).

Haider, Saira Bano, Dec. 2, 2008 Office Action from U.S. Appl. No. 11/104,759 filed Apr. 13, 2005 (10 pp.).

Lipman, Bernard, Sep. 14, 2006 Office Action from U.S. Appl. No. 11/168,297 filed jun. 29, 2005 (4 pp.).

Lipman, Bernard, Mar. 2, 2007 Notice of Allowance from U.S. Appl. No. 11/168,297 filed Jun. 29, 2005 (3 pp.).

Lipman, Bernard, Apr. 18, 2007 Supplemental Notice of Allowability from U.S. Appl. No. 11/168,297 filed Jun. 29, 2005 (3 pp.).

Lipman, Bernard, Mar. 20, 2008 Office Action from U.S. Appl. No. 11/764,607 filed Jun. 18, 2007 (4 pp.).

Lipman, Bernard, Sep. 25, 2008 Notice of Allowance from U.S. Appl. No. 11/764,607 filed Jun. 18, 2007 (3 pp.).

Russell, Graham, Nov. 4, 2008 Office Action from European Patent Application No. 05742316.2 filed Mar. 28, 2005 (2 pp.).

Schutte, M., Nov. 13, 2003 International Search Report from PCT Patent Application No. PCT/US02/31817 filed Oct. 4, 2002 (3 pp.).

Schutte, M., May 28, 2004 International Search Report from PCT Patent Application No. PCT/US03/40375 filed Dec. 18, 2003 (3 pp.).

Iraegui Retolaza, E., Jul.9, 2004 International Search Report from PCT Patent Application No. PCT/US2004/001000 filed Jan. 15, 2004 (3 pp.).

Russell, G., Aug. 1, 2005 International Search Report from PCT Patent Application No. PCT/US2005/010352 filed Mar. 28, 2005 (3 pp.).

Mettler, Rolf-Martin, May 27, 2008 International Search Report from PCT Patent Application No. PCT/US2007/087869 filed Dec. 18, 2007 (2 pp.).

Iraegui Retolaza, E., May 30, 2008 International Search Report from PCT Patent Application No. PCT/US2007/026031 filed Dec. 19, 2007 (3 pp.).

Whitmore, Mark Douglas et al., "Theory of Micelle Formation in Block Copolymer-Homopolymer Blends", Macromolecules, vol. 18, pp.657-665.

Wijmans, C.M. et al., "Effect of Free Polymer on the Structure of a Polymer Brush and Interaction between Two Polymer Brushes", Macromolecules, vol. 27, pp. 3238-3248 (1994).

Witten, T.A. et al., "Stress Relaxation in the Lamellar Copolymer Mesophase", Macromolecules, vol. 23, pp. 824-829 (1990).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Wang, Xiaorong et al., U.S. Appl. No. 10/791,049 filed Mar. 2, 2004 entitled "Method Of Making Nano-Particles Of Selected Size Distribution".

Wang, Xiaorong et al., U.S. Appl. No. 10/791,177 filed Mar. 2, 2004 entitled "Rubber Composition Containing Functionalized Polymer Nanoparticles".

Wang, Xiaorong et al., U.S. Appl. No. 10/872,731 filed Jun. 21, 2004 entitled "Reversible Polymer/Metal Nano-Composites And Method Manufacturing Same".

Wang, Xiaorong et al., U.S. Appl. No. 10/866,283 filed Jul. 6, 2004 entitled "Hydropobic Surfaces with Nanoparticles".

Wang, Xiaorong et al., U.S. Appl. No. 11/104,759 filed Apr. 13, 2005 entitled "Nano-Particle Preparation And Applications".

Bohm, Georg G.A. et al., U.S. Appl. No. 11/117,981 filed Apr. 29, 2005 entitled "Self Assembly Of Molecules To Form Nano-Particle".

Wang, Xiaorong et al., U.S. Appl. No. 11/305,279 filed Dec. 16, 2005 entitled "Combined Use Of Liquid Polymer And Polymeric Nanoparticles For Rubber Applications".

Wang, Xiaorong et al., U.S. Appl. No. 11/344,861 filed Feb. 1, 2006 entitled "Nano-Composite And Compositions Therefrom".

Wang, Xiaorong et al., U.S. Appl. No. 11/642,796 filed Dec. 20, 2006 entitled "Hollow Nano-Particles And Method Thereof".

Wang, Xiaorong et al., U.S. Appl. No. 11/764,607 filed Jun. 18, 2007 entitled "Multi-Layer Nano-Particle Preparation and Applications".

Warren, Sandra, U.S. Appl. No. 11/771,659 filed Jun. 29, 2007 entitled "One-Pot Synthesis Of Nanoparticles And Liquid Polymer For Rubber Applications".

Wang, Xiaorong et al., U.S. Appl. No. 11/941,128 filed Nov. 16, 2007 entitled "Nano-Particle Preparation And Applications".

Wang, Xiaorong et al., U.S. Appl. No. 11/954,268 filed Dec. 12, 2007 entitled "Nanoporous Polymeric Material And Preparation Method".

Wang, Xiaorong et al., U.S. Appl. No. 12/047,896 filed Mar. 13, 2008 entitled "Reversible Polymer/Metal Nano-Composites And Method For Manufacturing Same".

Wang, Xiaorong et al., U.S. Appl. No. 12/184,895 filed Aug. 1, 2008 entitled "Disk-Like Nanoparticle".

Bohm, Georg et al., "Emerging materials: technology for new tires and other rubber products", Tire Technology International, 2006 (4 pp.).

Cui, Honggang et al., "Block Copolymer Assembly via Kinetic Control", Science, vol. 317, pp. 647-650 (Aug. 3, 2007).

Edmonds, William F. et al., "Disk Micelles from Nonionic Coil-Coil Diblock Copolymers", Macromolecules, vol. 39, pp. 4526-4530 (May 28, 2006).

O'Reilly, Rachel K. et al., "Functional of Micelles and Shell Cross-linked Nanoparticles Using Click Chemistry", Chem. Mater., vol. 17, No. 24, pp. 5976-5988 (Nov. 24, 2005).

Wang, Xiaorong et al., "Strain-induced nonlimearity of filled rubbers", Physical Review E 72, 031406, pp. 1-9 (Sep. 20, 2005).

Pre-print article, Wang, Xiaorong et al., "PMSE 392 - Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filed elastomer under deformation", Europhysics Letters, vol. 75, No. 4, pp. 590-596 (Aug. 15, 2006).

Wang, Xiaorong et al., "Under microscopes the poly(styrene/butadiene) nanoparticles", Journal of Electron Microscopy, vol. 56, No. 6, pp. 206-216 (2007).

Wang, Xiaorong et al., "Heterogeneity of structural relaxation in a particle-suspension system", EPL, 79, 18001, pp. 1-5 (Jul. 2007).

Bridgestone Americas 2006 Presentation (14 pp.).

Harlan, Robert D., Final Office Action dated Dec. 10, 2008 from U.S. Appl. No. 10/791,177 (8 pp.).

Cain, Edward J., Final Office Action dated Dec. 9, 2008 from U.S. Appl. No. 11/642,795 (6 pp.).

Mulcahy, Peter D., Restriction/Election Office Action dated Dec. 11, 2008 from U.S. Appl. No. 11/642,802 (7 pp.).

* cited by examiner

US 7,544,740 B2

MULTI-LAYER NANO-PARTICLE PREPARATION AND APPLICATIONS

This application is a divisional application of U.S. Ser. No. 10/331,841 (filed Dec. 30, 2002), now U.S. Pat. No. 6,872,785 which is a continuation-in-part of U.S. Ser. No. 10/223,393 filed Aug. 19, 2002, now U.S. Pat. No. 6,956,084 which is a continuation-in-part of U.S. Ser. No. 09/970,830 (filed Oct. 4, 2001), now U.S. Pat. No. 6,437,050 and U.S. Ser. No. 10/038,748 (filed Dec. 31, 2001), now U.S. Pat. No. 6,689,469.

BACKGROUND OF THE INVENTION

The present invention relates to polymer nano-particles, methods for their preparation, and their use as, for example, additives for rubber, including natural and synthetic elastomers. The invention advantageously provides several mechanisms for surface modification, functionalization, and general characteristic tailoring to improve performance in rubbers, elastomers, and thermoplastics.

Polymer nano-particles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization and emulsion polymerization.

One benefit of using nano-particles as an additive in other materials is that they can be discrete particles uniformly dispersed throughout a host composition. Nano-particles preferably are monodisperse in size and uniform in shape. However, controlling the size of nano-particles during polymerization and/or the surface characteristics of such nano-particles can be difficult. Accordingly, achieving better control over the surface composition of such polymer nano-particles also is desirable.

Rubbers may be advantageously modified by the addition of various polymer compositions. The physical properties of rubber moldability and tenacity are often improved through such modifications. Of course, however, the indiscriminate addition of nano-particles to rubber may cause degradation of the matrix material, i.e., the rubber, characteristics. Moreover, it is expected that primarily through the selection of nano-particles having suitable size, material composition, and surface chemistry, etc., will improve the matrix characteristics.

In this regard, development of nano-particles having a surface layer which would be compatible with a wide variety of matrix materials is desirable because discrete particles could likely disperse more evenly throughout the host to provide a uniform matrix composition. However, the development of a process capable of reliably producing acceptable nano-particles has been a challenging endeavor. For example, the solubility of various monomers in traditional alkane solvents has made solution polymerization a difficult process by which to achieve nano-particles having tailored variety of surface layers. Moreover, the development of a solution polymerization process which produces reliable nano-particles, particularly nano-particles advantageously employed in rubber compositions, has been elusive.

SUMMARY OF THE INVENTION

A multi-layer nano-particle composition including a poly(alkenylbenzene) core and at least two additional layers is provided. The nano-particles have a mean average diameter less than about 100 nm. As used herein, the use of the phrase "additional layers" reflects, for example, layers formed of divergent monomers or of the same monomers but having differing characteristics including molecular weight, vinyl modification, functionalization, etc. As one effective usual characteristic of the present nano-particles, they can be described as onion-like in view of their multiple layers.

A process for forming a multi-layer nano-particle is also provided. The process includes initiating the block copolymerization of a first monomer in a hydrocarbon solvent to form a living polymerization mixture. At least a second monomer is then added to the polymerization mixture and polymerized to form a living polymer chain. An alkenylbenzene monomer is also added to the polymerization mixture and allowed to polymerize onto the living polymer chain. The living polymer chains are made to aggregate to form micelles and at least one crosslinking agent is added to the polymerization mixture to form crosslinked nano-particles having a poly(alkenylbenzene) core and at least two additional layers.

A rubber composition including an elastomer, nano-particles, carbon black, silica and a curing agent having low shrinkage properties is also provided. A process for preparing the rubber compound is similarly provided. Such compound shows its relatively high hysterisis, good tensile strength, good tear strength, strong resistance to creep, high temperature resistance, and good aging properties. A process of making the rubber compound for engine mount applications is similarly provided.

Herein throughout, unless specifically stated otherwise:
"vinyl-substituted aromatic hydrocarbon" and "alkenylbenzene" are used interchangeably; and
"rubber" refers to rubber compounds, including natural rubber, and synthetic elastomers including styrene-butadiene rubber, ethylene propylene rubber, etc., which are known in the art.

DETAILED DESCRIPTION OF ILLUSTRATIVE EMBODIMENTS

General Nano-Particle Process of Formation

Figure 1:
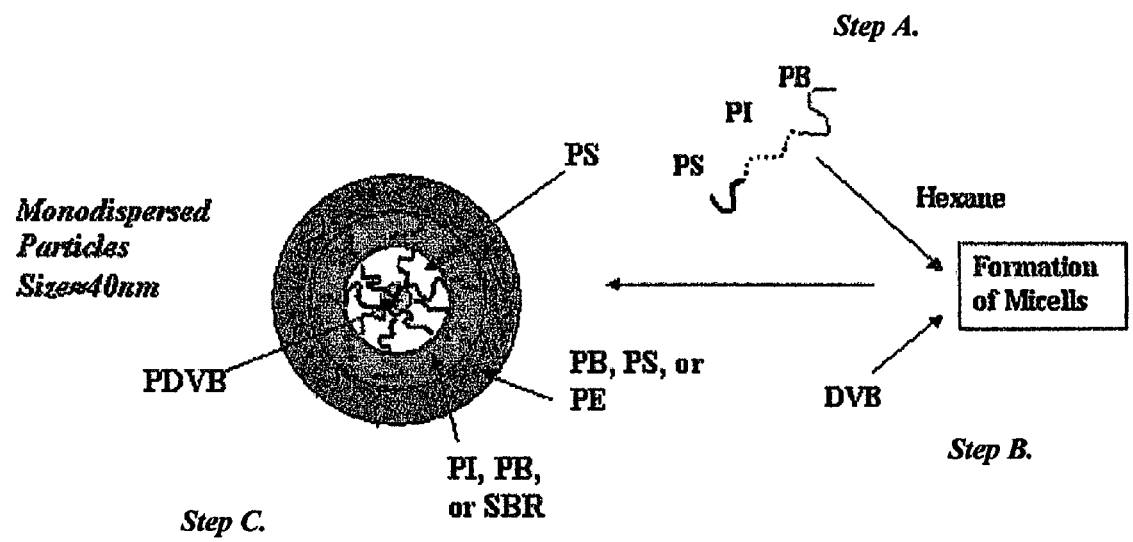
FIG. 1 is a schematic depicting the principle of formation of multi-layer nano-particles.

This application incorporates by reference U.S. Ser. No. 09/970,830 (filed Oct. 4, 2001), now U.S. Pat. No. 6,437,050, and U.S. Ser. No. 10/038,748 (filed Dec. 31, 2001) and U.S. Ser. No. 10/223,393 (filed Aug. 19, 2002).

One exemplary polymer nano-particle of the present invention is formed from multiblock polymer chains having at least three blocks selected primarily from poly(conjugated diene) block and poly(alkenylbenzene) blocks. Of course, the various monomer constituents may be present to a limited extent in the blocks of another selected monomer. In addition, the present invention anticipates nano-particles wherein one or more layers are formed of a random copolymer of two or more monomer units.

The poly(alkenylbenzene) blocks may be crosslinked to form the desired nano-particles. The nano-particles have diameters—expressed as a mean average diameter—that are preferably less than about 100 nm, more preferably less than about 75 nm, and most preferably less than about 50 nm. The nano-particles preferably are substantially monodisperse and uniform in shape. The dispersity is represented by the ratio of $M_w$ to $M_n$, with a ratio of 1 being substantially monodisperse. The polymer nano-particles of the present invention preferably have a dispersity less than about 1.3, more preferably less than about 1.2, and most preferably less than about 1.1. Moreover, the nano-particles are preferably spherical, though shape defects are acceptable, provided the nano-particles generally retain their discrete nature with little or no polymerization between particles.

The nano-particles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination. However, as more fully described herein below, selection of a solvent in which one polymer forming the nano-particles is more soluble than another polymer forming the nano-particles is important in micelle formation.

With respect to the monomers and solvents identified herein, nano-particles are formed by maintaining a temperature that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature and solvent, facilitates the formation of block polymers which form micelles and ultimately the desired nano-particles.

According to one embodiment of the invention, a first multiblock polymer is formed of at least vinyl aromatic hydrocarbon monomers and conjugated diene monomers in the hydrocarbon solvent. The multiblock polymer contains at least one block that is soluble in the dispersion solvent, preferably a conjugated diene monomer, and at least an end block which is less soluble in the dispersion solvent, preferably a vinyl-substituted aromatic hydrocarbon monomer. Moreover, in one embodiment, a vinyl-substituted aromatic hydrocarbon monomer is chosen the polymer of which is generally insoluble in the dispersion solvent.

As is known in the art, such a multiblock copolymer may be formed by living anionic polymerization, in which each block is formed by adding a new monomer charge to a living polymerization mixture in which polymerization is substantially complete.

Additionally, other blocks are incorporated into the block copolymer, including additional poly(conjugated diene) blocks or poly(alkenylbenzene) blocks, as well as other blocks such as poly(alkylene) blocks. Other suitable monomer units include ethylene oxide, methyl methacrylate, nitrites, acrylates, and mixtures thereof.

Another method of forming substantially multiblock polymers is the living anionic copolymerization of a mixture of monomers, such as a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Of course, certain advantages may be achieved via a random polymerization of at least one block of the polymer.

However, since more than one additional polymer block is to be incorporated into the nano-particle, it may be preferred to utilize the first-described polymerization technique, wherein subsequent monomer units are added after substantially complete polymerization of each previous block.

Such multi-block polymers, are believed to aggregate to form micelle-like structures, with for example, vinyl-substituted aromatic blocks directed toward the centers of the micelles and all other blocks as tails extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks. An exemplary temperature range for micelle formation is between about 0 and 100° C., more preferably between about 20 and 80° C.

Although the above describes formation of multi-block polymers prior to micelle formation, it is noted that after the micelles have formed, additional monomer charge(s), such as conjugated diene monomer and/or vinyl-substituted aromatic hydrocarbon monomer, can be added to the polymerization mixture as desired. In this manner, multi-block polymers may again be formed when only diblock polymers form the micelles. Moreover, it is feasible to form the micelles of the block copolymers with a further monomer(s) charge thereafter.

After formation of the micelles, a cross-linking agent is added to the polymerization mixture. Preferably a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the desired nano-particle. Consequently, nano-particles are formed from the micelles with a core including, for example, styrene monomer units and a surface layer including, for example, butadiene monomer units. Reference to FIG. 1 schematically depicts the above-described process, including a Step A (polymerization); Step B (micelle formation); and Step C (nano-particle formation).

The conjugated diene monomers contemplated for the block polymer are those soluble in non-aromatic hydrocarbon solvents. $C_4$-$C_8$ conjugated diene monomers are the most preferred. Exemplary conjugated diene monomers include 1,3-butadiene, isoprene, and 1,3-pentadiene.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons, and mixtures thereof.

The multiblock polymer, preferably has $M_w$ of about 5,000 to 1,000,000, more preferably between about 10,000 and 100,000. A typical multiblock polymer will be comprised of 5 to 8% by weight conjugated diene and 95 to 5% by weight vinyl-substituted aromatic hydrocarbon, more preferably 30 to 70% by weight, and most preferably 40 to 60% by weight of each contributed monomer type, with the weight being distributed among multiple blocks if more than one block of each contributed monomer type is present.

The micelle formed by the above described polymerization is preferably crosslinked to enhance the uniformity and permanence of shape and size of the resultant nano-particle. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

A 1,2-microstructure controlling agent or randomizing modifier is optionally used to control the 1,2-microstructure in the conjugated diene contributed monomer units, such as 1,3-butadiene, of the nano-particle. Suitable modifiers include hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 4000 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the polymer nano-particle. The 1,2-microstructure content of the conjugated diene units is preferably between about 5% and 95%, and preferably less than about 35%.

Without being bound by theory, it is believed that an exemplary micelle will be comprised of ten to five hundred multiblock polymers yielding, after crosslinking, a nano-particle having a $M_w$ of between about 5,000 and 10,000,000, preferably between about 5,000 and 4,500,000.

Structural Modifications

In an alternative embodiment, at least one layer of the polymer nano-particle includes a copolymer including at least one alkenylbenzene monomer unit and at least one conjugated diene monomer unit. The copolymer may be random or ordered. In one such embodiment the copolymer layer includes a SBR rubber. Herein throughout, references to a poly(conjugated diene) layer are understood to include copolymers of the type described here.

Similarly, the density of the nanoparticle may be controlled by including monoblock, diblock, and/or multiblock polymer chains in the micelles. One method for forming such polymer chains includes forming a first polymer in the hydrocarbon solvent. After formation of the first polymer, a second monomer is added to the polymerization, along with additional initiator. The second monomer polymerizes onto the first polymer to form a living diblock polymer as well as forming a separate second polymer which is a living mono-block polymer. A third polymer may then be added along with additional initiator. The third polymer would polymerize onto the diblock polymer to form a multi-block onto the monoblock polymer to form a diblock, as well as forming a third polymer which is a living monoblock polymer. The multi-block polymer contains at least a first end block that is soluble in the dispersion solvent, and a second end block which is less soluble in the dispersion solvent, preferably the vinyl-substituted aromatic hydrocarbon monomer.

Without being bound by theory, it is believed that a large number of mono-block polymer chains in the core of the nano-particle results in and less entanglement of the tails of the diblock and multiblock chains. The resultant surface layer thus may have a brush-like structure.

The mono-block polymer preferably has $M_w$ between about 1,000 and 1,000,000, more preferably between about 5,000 and 100,000. The multi-block polymer preferably has $M_w$ of about 1,000 to 1,000,000 more preferably between about 5,000 and 100,000. The di-block polymer preferably has a Mw of about 1,000 to 1,000,000, more preferably between about 5,000 and 100,000.

The density of the surface layers of the nano-particles may be controlled by manipulating the ratio of multiblock to diblock to mono-block polymer chains. This ratio may be manipulated by altering the amount of initiator added during each step of the polymerization process. For example, a greater amount of initiator added during the first polymerization step than added during subsequent polymerization steps would favor multiblock formation over mono-block formation, resulting in a high density surface layer. Conversely, a greater amount of initiator added during the subsequent polymerization steps than added during the first polymerization step would favor mono-block or diblock formation over multi-block formation, resulting in a low-density surface layer. The ratio of the initiator added during the subsequent polymerization steps to that added during the first polymerization step can range from about 0 to 10.

Hydrogenation of a Nano-Particle Surface Layer

After micelle formation, or alternatively, after crosslinking, polydiene blocks, for example, may be hydrogenated to form a desired surface layer. Furthermore, one or more poly (conjugated diene) blocks can be selectively hydrogenated while leaving additional poly(conjugated diene) blocks non-hydrogenated. A hydrogenation step may be carried out by methods known in the art for hydrogenating polymers, particularly polydienes. A preferred hydrogenation method includes placing the crosslinked nano-particles in a hydrogenation reactor in the presence of a catalyst. After the catalyst has been added to the reactor, hydrogen gas ($H_2$) is charged to the reactor to begin the hydrogenation reaction. The pressure is adjusted to a desired range via addition of $H_2$, preferably between about 10 and 3000 kPa, more preferably between about 50 and 2600 kPa. $H_2$ may be charged continuously or in individual charges until the desired conversion is achieved. Preferably, the hydrogenation reaction will reach at least about 20% conversion, more preferably greater than about 85% conversion. The conversion reaction may be monitored by $H^1$ NMR.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octolate, nickel ethylhexanoate, and mixtures thereof.

The layers formed by an optional hydrogenation step will vary depending on the identity of the monomer units utilized in the formation of poly(conjugated diene) blocks. For example, if a poly(conjugated diene) block contains 1,3-butadiene monomer units, the resultant nano-particle layer after hydrogenation will be a crystalline poly(ethylene) layer. In another embodiment, a layer may include both ethylene and propylene units after hydrogenation if the non-hydrogenated poly (conjugated diene) block contains isoprene monomer units. It should be noted that the non-hydrogenated poly (conjugated diene) block may contain a mixture of conjugated diene monomer units, resulting in a mixture of monomer units after hydrogenation.

Initiators and Functionalized Nano-Particles

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$-$C_{20}$ hydrocarbyl radical, preferably a $C_2$-$C_8$ hydrocarbyl radical and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyllithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred. Other suitable lithium inititators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Functionalized lithium initiators are also contemplated as useful in the present copolymerization. Preferred functional groups include amines, formyl, carboxylic acids, alcohols, tin, silica, and mixtures thereof.

Especially preferred initiators are amine-functionalized initiators, such as those that are the reaction product of an amine, an organo lithium and a solubilizing component. The initiator has the general formula:

(A)Li(SOL)$_y$ where y is from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula:

and cyclic amines having the general formula:

where $R^1$ is selected from the group consisting of alkyls, cycloalkyls or aralkyls having from 1 to about 12 carbon atoms, and $R^2$ is selected from the group consisting of an alkylene, substituted alkylene, oxy- or N-alkylamino-alkylene group having from about 3 to about 16 methylene groups. An especially preferred functionalized lithium initiator is hexamethylene imine propyllithium.

Tin functionalized lithium initiators may also be preferred as useful in the present invention. Suitable tin functionalized lithium initiators include tributyl tin lithium, trioctyl tin lithium, and mixtures thereof.

Anionic initiators generally are useful in amounts ranging from about 0.01 to 60 millimoles per hundred grams of monomer charge.

A nano-particle including multiblock polymers initiated with a functionalized initiator may include functional groups on the surface of the nano-particle. For example, when block polymers are initiated by hexamethylene imine propyllithium, the initiator residue remaining at the beginning of the polymer chain will contain an amine group. Once the polymer chains have aggregated and have been crosslinked, the resultant nano-particles will contain amine groups on or near the nano-particle surface.

An exemplary nano-particle formed from copolymers initiated by a functionalized tin lithium initiator may have a crosslinked alkenylbenzene core, for example polystyrene, and a surface layer including at least a poly(conjugated diene), for example 1,3-butadiene. The surface layer will also include a functionalized initiator residue at the individual chain ends (i.e., tin).

Polymer Nano-Particle Applications

A variety of applications are contemplated for use in conjunction with the nano-particles of the present invention. Furthermore, the several mechanisms described herein for modifying the nano-particles render them more suitable for different applications. All forms of the present inventive nano-particles are, of course, contemplated for use in each of the exemplary applications and all other applications envisioned by the skilled artisan.

General Rubber

After the polymer nano-particles have been formed, they may be blended with a rubber to improve the physical characteristics of the rubber composition. Nano-particles are useful modifying agents for rubbers because they are discrete particles which are capable of dispersing uniformly throughout the rubber composition, resulting in uniformity of physical characteristics. Furthermore, certain of the present polymer nano-particles are advantageous because various layers including poly(conjugated diene), especially vinyl-modified poly(conjugated diene), are capable of bonding with a rubber matrix due to the accessibility of the double bonds in the poly(conjugated diene).

The present polymer nano-particles are suitable for modifying a variety of rubbers including, but not limited to, random styrene/butadiene copolymers, butadiene rubber, poly(isoprene), nitrile rubber, polyurethane, butyl rubber, EPDM, and the like. Advantageously, the inclusion of the present nano-particles have demonstrated rubbers having improved tensile and tear strength of at least about 30% over a rubber modified with non-spherical copolymers.

Furthermore, nano-particles with hydrogenated layers may demonstrate improved compatibility with specific rubbers. For example, nano-particles including a hydrogenated polyisoprene layer may demonstrate superior bonding with and improved dispersion in an EPDM rubber matrix due to the compatibility of hydrogenated isoprene with EPDM rubber.

Additionally, nano-particles with copolymer layers may demonstrate improved compatibility with rubbers. The copolymer tails within a layer of the nano-particles may form a brush-like surface. The host composition is then able to diffuse between the tails allowing improved interaction between the host and the nano-particles.

Hard Disk Technology

Hydrogenated nano-particles prepared in accordance with the present invention may also find application in hard disk technology.

Disk drive assemblies for computers traditionally include a magnetic storage disk coaxially mounted about a spindle apparatus that rotates at speeds in excess of several thousand revolutions per minute (RPM). The disk drive assemblies also include a magnetic head that writes and reads information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from the environmental contaminant outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives. The hydrogenated nano-particles, when compounded with a polyalkylene and a rubber, demonstrate a tensile strength comparable to that necessary in hard disk drive compositions.

Thermoplastic Gels

Nano-particles prepared in accord with the present invention, whether hydrogenated or non-hydrogenated may also be blended with a variety of thermoplastic elastomers, such as SEPS, SEBS, EEBS, EEPE, polypropylene, polyethylene, polystyrene, and mixtures thereof. For example, nano-particles with hydrogenated isoprene layers may be blended with a SEPS thermoplastic to improve tensile strength and thermostability. These blends of thermoplastic elastomer and nano-particles would typically be extended as known in the art. For example, suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in compositions of the present invention are low molecular weight organic materials having a number-average molecular weight of less than 20,000, preferably less than 10,000, and most preferably less than 5000. Although there is no limitation to the material which may be employed, the following is a list of examples of appropriate materials:

Softening agents, namely aromatic naphthenic and araffinic softening agents for rubbers or resins;

Plasticizers, namely plasticizers composed of esters including phthalic, mixed pthalic, aliphatic dibasic acid, glycol, fatty acid, phosphoric and stearic esters, epoxy plasticizers, other plasticizers for plastics, and phthalate, adipate, scbacate, phosphate, polyether and polyester plasticizers for NBR;

Tackifiers, namely coumarone resins, coumaroneindene resins, terpene phenol resins, petroleum hydrocarbons and rosin derivative;

Oligomers, namely crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-a-olefins;

Lubricants, namely hydrocarbon lubricants such as paraffin and wax, fatty acid lubricants such as higher fatty acid and ydroxyl-fatty acid, fatty acid amide lubricants such as fatty acid amide and alkylene-bisfatty acid amide, ester lubricants such as fatty acid-lower alcohol ester, fatty acid-polyhydrie alcohol ester and fatty acid-polyglycol ester, alcoholic lubricants such as fatty alcohol, polyhydric alcohol, polyglycol and polyglycerol, metallic soaps, and mixed lubricants; and, Petroleum hydrocarbons, namely synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used in as extenders.

Surface functionalized nano-particles prepared in accordance with the present invention, whether hydrogenated or non-hydrogenated, may also be compounded with silica containing rubber compositions. Including surface functionalized nano-particles in silica containing rubber compositions has been shown to decrease the shrinkage rates of such silica containing rubber compositions. Functionalized nano-particles may be compounded in silica compositions in concentrations up to about 50 wt % of the total composition, more preferably up to about 40 wt % most preferably up to about 30 wt %.

Tire Rubber

One application for such rubber compounds is in tire rubber formulations.

Vulcanizable elastomeric compositions of the invention are prepared by mixing a rubber, a nanoparticle composition, with a reinforcing filler comprising silica, or a carbon black, or a mixture of the two, a processing aid and/or a coupling agent, a cure agent and an effective amount of sulfur to achieve a satisfactory cure of the composition.

The preferred rubbers are conjugated diene polymers, copolymers or terpolymers of conjugated diene monomers and monovinyl aromatic monomers. These can be utilized as 100 parts of the rubber in the tread stock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epicholrohydrin rubber, chlorinated polyethylene-propylene rubbers, chlorosulfonated polyethylene rubber, hydrogenated nitrile rubber, terafluoroethylene-propylene rubber, and the like.

Examples of reinforcing silica fillers which can be used in the vulcanizable elastomeric composition include wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are preferred. Silica can be employed in the amount of about one to about 100 parts per hundred parts of the elastomer (phr), preferably in an amount of about 5 to 80 phr and, more preferably, in an amount of about 30 to about 80 phrs. The useful upper range is limited by the high viscosity imparted by fillers of this type. Some of the commercially available silica which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0, and J. M. Huber Corporation.

Including surface functionalized nano-particles in silica containing rubber compositions has been shown to decrease the shrinkage rates of such silica containing rubber compositions. Functionalized nano-particles may be compounded in silica compositions in concentrations up to about 30 wt % of the total composition, more preferably up to about 40 wt %, most preferably up to about 50 wt %.

The rubber can be compounded with all forms of carbon black, optionally additionally with silica. The carbon black can be present in amounts ranging from about one to about 100 phr. The carbon black can include any of the commonly available, commercially-produced carbon blacks, but those having a surface are of at least 20 $m^2/g$ and, or preferably, at least 35 $m^2/g$ up to 200 $m^2/g$ or higher are preferred. Among useful carbon blacks are furnace black, channel blacks, and lamp blacks. A mixture of two or more of the above blacks can be used in preparing the carbon black products of the invention. Typical suitable carbon black are N-110, N-220, N-339, N-330, N-352, N-550, N-660, as designated by ASTM D-1765-82a.

Certain additional fillers can be utilized including mineral fillers, such as clay, talc, aluminum hydrate, aluminum hydroxide and mica. The foregoing additional fillers are optional and can be utilized in the amount of about 0.5 phr to about 100.

Numerous coupling agent and compatibilizing agent are know for use in combining silica and rubber. Among the silica-based coupling and compatibilizing agents include silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl)tetrasulfide (Si69), bis-(3-triethoxysilylpropyl) disulfide (Si75), and those alkyl alkoxysilanes of the such as octyltriethoxy silane, and hexyltrimethoxy silane.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators processing additives, such as oils, resins, including tackifying resins, plasticizers, pigments, additional filers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in the conventional amounts.

Specifically, the above-described nano-particle containing rubber compounds are contemplated for use in rubber compounds used to make tire treads and side walls due to the enhanced reinforcement capabilities of the present nano-particles. The higher dynamic modulus (G') and its lower temperature dependence along with the lower hystersis values at high temperatures leads to improved cornering, handling, dry, snow, and wet traction, rolling resistance, dispersion, and aging properties of the resultant tire compositions. Tin-functionalized nano-particles are especially suited for use in tire compositions. Improved aging properties, thermal aging (high temperature), or mechanical aging (static or dynamic deformation cycles), include retention of the G' modulus, hysteresis, mechanical strengths, etc. Tin-functionalized nano-particles are especially suited for use in tire compositions. Nano-particles including a copolymer layer are also suitable for use in such tire compositions, because the longer copolymer chains in the layer lead to greater diffusion of the host rubber composition into the surface layer of the nano-particle. Of course, a functionalized nano-particle having at least one copolymer layer, i.e., the combination of the two alternatives may be most beneficial.

Engineering Plastic and Others

Similarly, the nano-particles can be added into typical plastic materials, including polyethylene, polypropylene, polystyrene, polycarbonate, nylon, polyimides, etc. to for example, enhance impact strength, tensile strength and damping properties.

Of course, the present inventive nano-particles are also suited to other presently existing applications for nano-particles, including the medical field, e.g. drug delivery and blood applications, information technology, e.g. quantum computers and dots, aeronautical and space research, energy, e.g., oil refining, and lubricants.

Engine Mount, Etc.

Another application for such rubbers is in situations requiring superior damping properties, such as engine mounts and hoses (e.g. air conditioning hoses). Rubber compounds of high mechanical strength, super damping properties, and strong resistance to creep are demanded in engine mount manufacturers. In engine mounts, a rubber, because it sits most of its life in a packed and hot position, requires very good characteristics. Utilizing the nano-particles within selected rubber formulations can improve the characteristics of the rubber compounds.

The present invention now will be described with reference to non-limiting examples. The following examples and tables are presented for purposes of illustration only and are not to be construed in a limiting sense.

EXAMPLES

Preparation of Multi-Layer Nano-Particles

An 8 L reactor equipped with external jacket heating and internal agitation was used for all polymerizations. 1,3-Butadiene was used as a 22.0 or 21.1 wt % solution in hexane (Bridgestone/Firestone Polymer Co., Akron, Ohio). Styrene was used as a 33.0 wt. % solution in hexane (Bridgestone/Firestone Polymer Co., Akron, Ohio), and n-butyllithium was used as a 15 wt % solution in hexane (Bridgestone/Firestone Polymer Co., Akron, Ohio). An antioxidant butylated hydroxytoluene (BHT), (Aldrich Chem. Co., Milwaukee, Wis.) was used as an approximately 17 wt % solution in hexane. Technical grade divinylbenzene (DVB), (80% as a mixture of isomers, Aldrich) was passed through a column of inhibitor remover under $N_2$ before use. Neat bis-oxalanyl propane (OOPs), (Aldrich) was similarly treated and used as a 1.6 M solution in hexane, stored over calcium hydride.

Example 1

Figure 2:
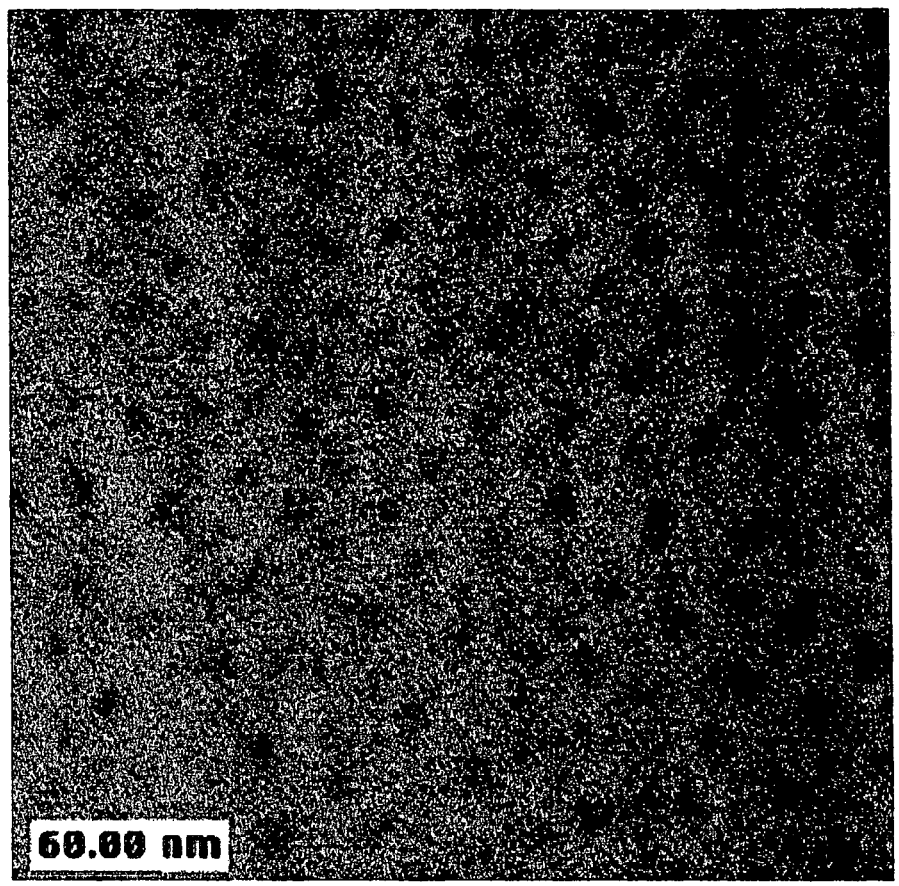
FIG. 2 is a transmission electron microscopy (TEM) photograph of multi-layer nano-particles produced in accordance with EXAMPLE 1.

The reactor was first charged with 2.3 kg of hexane. The reactor was then charged with 517 g butadiene/hexane blend that contained 22 wt % butadiene, and the batch was heated to 57° C. After the temperature stabilized, polymerization was initiated with 5.4 mL of a 1.5 M solution of n-butyl lithium in hexane. The reactor batch temperature was maintained at 57° C. for the duration of the polymerization. After 2 hours, (when the reaction was finished) the reactor was charged with 4.5 kg of isoprene/hexane blend that contained 15% isoprene. After 1.5 hours, the reactor was charged with 453 g of a styrene/hexane blend that contained 33 wt % styrene. After an additional 1.5 hours, the reactor was charged with 50 mL of divinyl benzene. The reactor was maintained at 57° C. for a 2-hour period and then discharged. The product was dropped into an acetone/isopropanol (~95/5) blend, and dried. GPC analysis of the product showed that the molecular weight ($M_w$) of the particle polymer is 954,390. The polydispersity of the product is 1.10. TEM analysis showed that the average particle size was ~30 nm, and the dispersity of the particle size was about 1.1 (see FIG. 2). The structure of the particle contains a polystyrene-core, a poly-isoprene layer, and a poly-butadiene surface layer.

Example 2

A 4 L polymerization reactor was used for the preparation. The reactor was first charged with 3 L of a nano-particle/hexane solution, containing 10 wt % of example 1. The reactor was then charged with 75 mL of a Ni catalyst solution, which was made according to the following procedure.

111 mL of nickel octolate (8 wt % in hexane), 37 mL hexane, and 06 mL of cyclohexene were charged to a 1 liter $N_2$ purged bottle. Then, the bottle was placed into a dry ice bath. A charge of 266.4 mL of tributyl aluminum (0.68 M in hexane) was slowly added into the bottle while kept cool.

The hydrogenation reactor, containing polymer product and catalyst was then heated to 120° C. After the temperature stabilized, the hydrogenation was initialized by charging high pressure $H_2$ gas into the reactor to about 792 kPa. After about 15 minutes, the pressure dropped as the $H_2$ began to react. The reactor was again recharged to about 792 kPa. The procedure was then repeated until the butadiene hydrogenation conversion reached about 95%, based on $H^1$ NMR analysis. The reactor was then cooled and the product dropped into isopropanol solvent. The obtained polymer particles were dried in vacuum for 2 days at 23° C.

Figure 3:
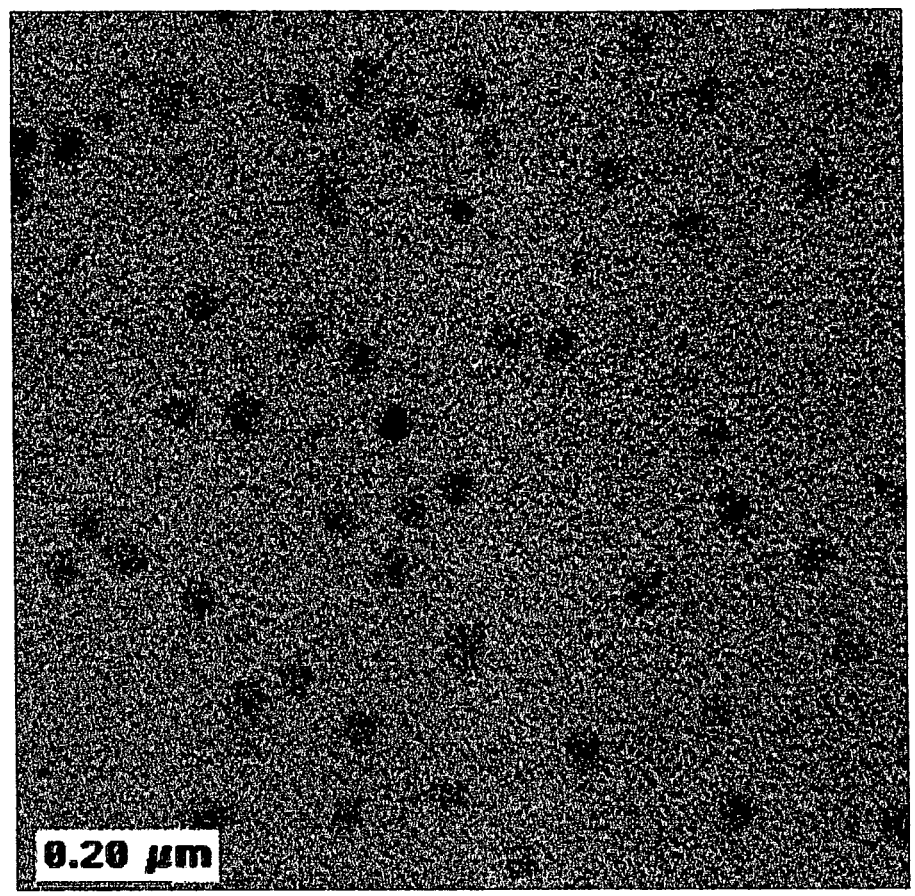
FIG. 3 is a TEM photograph of hydrogenated multi-layer nano-particles produced in accordance with EXAMPLE 2.

The procedure was repeated until the isoprene hydrogenation conversion reached 100% based on $H^1$ NMR analysis. TEM analysis showed that the average particle size was ~35 nm, and the dispersity was about 1.1 (see FIG. 3). The structure of the particle contained a polystyrene core, a poly(ethylene-co-propylene) layer, and a polyethylene shell.

Example 3

Figure 4:
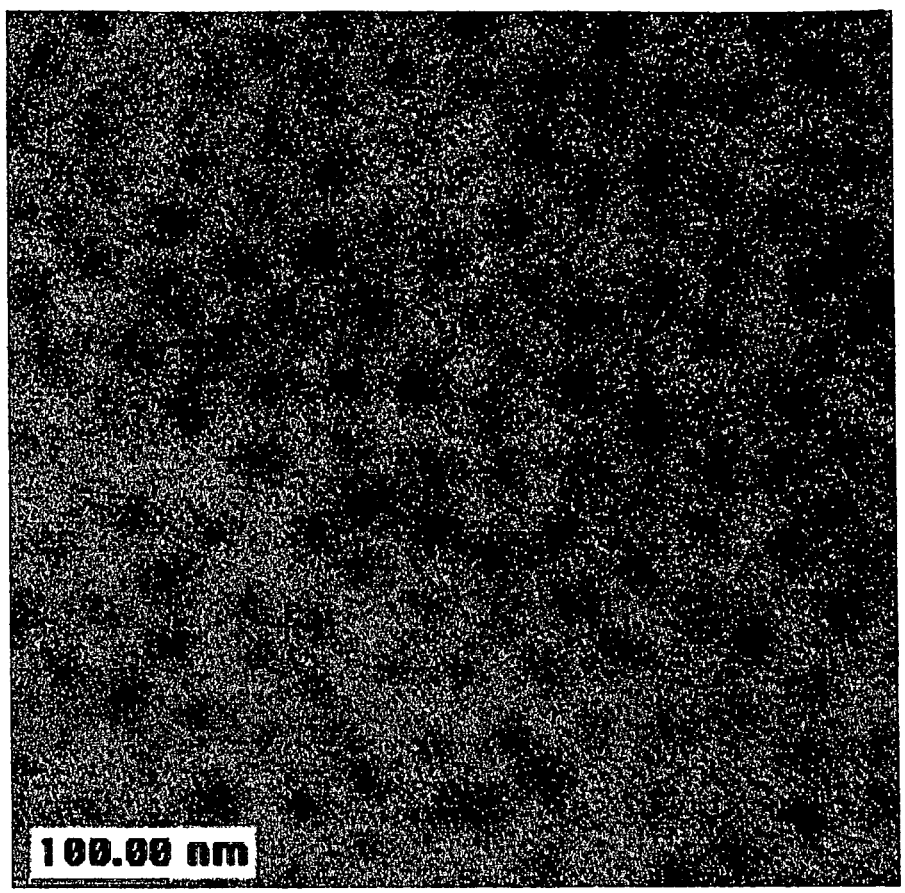
FIG. 4 is a TEM photograph of multi-layer nano-particles produced in accordance with EXAMPLE 3.

The reactor was first charged with 517 g of hexane. The reactor was charged with 340 g styrene/hexane blend containing 33 wt % styrene, and the batch was heated to 57° C. After the temperature had stabilized, polymerization was initiated with 5.4 mL of a 1.5 M solution of n-butyllithium in hexane. The reactor batch temperature was maintained at 57° C. for the duration of the polymerization. After 1.5 hours, (when the reaction was finished), the reactor was charged with 1.0 kg of butadiene/hexane blend that contained 22 wt % butadiene. After another 1.5 hours, the reactor was charged with 340 g of styrene/hexane blend that contained 33 wt % styrene. After an additional 1.5 hour reaction, the reactor was charged with 1.8 kg hexane. After 20 minutes, the reactor was charged with 50 mL of DVB for the crosslinking reaction. The reactor was maintained at 57° C. for another 1.5 hour period, then discharged. The product was dropped into acetone/isopropanol (~95/5) blend, and dried. GPC analysis of the product showed that the molecular weight ($M_w$) of the particle polymer was 3,271,180. The polydispersity was 1.08. TEM analysis showed that the average particle size was ~35 nm, and the dispersity of the particle size was about 1.1 (see FIG. 4). The structure of the particle contained the polystyrene core, the polybutadiene layer, and a polystyrene surface layer.

Examples 4-6

Three kinds of rubber compositions were prepared according to the formulation shown in Tables 1 and 2 by selectively using the synthesized onion like polymer particles (i.e., example 1) to replace 10 parts of butadiene rubber in the compound formulation. In each sample, a blend of the ingredients was kneaded by a method listed in Table 3. The final stock was sheeted and molded at 160° C. for about 30 minutes.

As shown in Table 4, the test compounds exhibited well balanced physical properties. At least, the tensile strength, dynamic modulus and damping properties were improved over that of the comparative compounds.

TABLE 1

Composition for Master Batch

| Component | Pbw |
| --- | --- |
| Polybutadiene (HX 301) | 100.00 |
| Carbon black (N343) | 50.00 |
| Aromatic oil | 15.00 |
| Zinc oxide | 3.00 |
| Hydrocarbon resin (tackifiers) | 2.00 |
| Santoflex 13 (antioxidants) | 0.95 |
| Stearic acid | 2.00 |
| Wax | 1.00 |

TABLE 2

Composition for Final Batch

| Additional component added to master batch of table 14 | Pbw |
| --- | --- |
| Sulfur | ~1.30 |
| Cyclohexyl-benzothiazole sulfenamide (accelerator) | 1.40 |
| Diphenylguanidine (accelerator) | 0.20 |

TABLE 3

Mixing Conditions

| Mixer: 300 g Brabender | Agitation speed: 60 rpm |
| --- | --- |
| Master Batch Stage | |
| Initial Temperature | 110° C. |
| 0 minutes | Charging polymers |
| 0.5 minutes | Charging oil and carbon black |
| 5.0 minutes | Drop |
| Final Batch Stage | |
| Initial Temperature | 75° C. |
| 0 seconds | Charging master stock |
| 30 seconds | Charging curing agent and accelerators |
| 75 seconds | Drop |

TABLE 4

Experimental results of Multi-Layer Nano-particles:

|  |  | Example | | |
|---|---|---|---|---|
|  |  | 4 (control) | 5 | 6 |
| Test polymers | Example 3 |  | 10 |  |
|  | Example 1 |  |  | 10 |
| Butadiene |  | 100 | 90 | 90 |
| Carbon black |  | 50 | 50 | 50 |
| Aromatic oil |  | 15 | 15 | 15 |
| Shore A | 22° C. (3 seconds) | 56.1 | 60.7 | 58.4 |
|  | 100° C. (3 seconds) | 53.9 | 56.1 | 55.6 |
|  | Ring Tensile |  |  |  |
| 23° C. | Tb (kPa) | 13,511 | 14,200 | 12,926 |
|  | Eb (%) | 494 | 485 | 483 |
|  | M300 | 925 | 1060 | 950 |
|  | M50 | 151 | 187 | 166 |
| 100° C. | Tb (kPa) | 6842 | 8068 | 7200 |
|  | Eb (%) | 355 | 383 | 362 |
|  | M300 | 780 | 835 | 806 |
|  | M50 | 122 | 135 | 130 |
| Ring Tear | Strength (kg/cm) | 34.01 | 37.05 | 38.31 |
|  | Travel (%) 170° C. | 439 | 437 | 453 |
| Tg of compound (tan δ) |  | −75 | −75 | −75 |
| Dynastat | M' 50° C. (mPa) | 6.7711 | 8.7605 | 7.6634 |
|  | M' 23° C. (mPa) | 7.8233 | 10.6590 | 9.1403 |
|  | M' 0° C. (mPa) | 9.6050 | 14.1940 | 11.6610 |
|  | M' −20° C. (mPa) | 11.3360 | 15.8320 | 13.000 |
|  | tan δ 50° C. | 0.18533 | 0.20372 | 0.19581 |
|  | tan δ 23° C. | 0.21062 | 0.22369 | 0.22109 |
|  | tan δ 0° C. | 0.23358 | 0.23813 | 0.24245 |
|  | tan δ −20° C. | 0.25302 | 0.25763 | 0.26128 |

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A process for forming a multi-layer polymer nano-particle comprising;
   a. initiating a polymerization of at least a first monomer in a hydrocarbon solvent to form a living polymerization mixture;
   b. adding at least a second monomer to the polymerization mixture allowing the second monomer to polymerize onto a living polymer chain to form a living block copolymer chain;
   c. adding an alkenylbenzene monomer to polymerize onto the living block copolymers chain;
   d. allowing the living block copolymer chains to form micelles; and
   e. adding at least one crosslinking agent to the polymerization mixture to form cross-linked nano-particles from said micelles.

2. The process of claim 1 wherein step a is performed in the presence of a lithium initiator.

3. The process of claim 2 wherein said lithium initiator is functionalized.

4. The process of claim 1 further including a hydrogenation step.

5. The process of claim 4 wherein said hydrogenation step is performed subsequent to step c.

6. The process of claim 4 wherein said hydrogenation step converts a poly (conjugated diene) layer to a poly(alkylene) layer.

7. The process of claim 1 further including an additional polymerization of alkenylbenzene to form a mono-block polymer.

8. The process of claim 7 wherein the ratio of said mono-block polymer to said diblock polymer may be controlled by selective addition of initiator.

9. The process of claim 1 wherein said living block copolymer includes a copolymer block.

10. The process of claim 1 wherein said first and second monomers are independently selected from the group consisting of alkenylbenzene, acrylates, conjugated dienes, nitrites, alkylenes, and mixtures thereof.

11. The process of claim 1 further including additional polymerization steps between steps b and c.

12. The process of claim 11 wherein said additional polymerization steps result in additional polymer blocks in the living block copolymer chain.

13. The process of claim 1 wherein said nano-particle includes at least three layers.

14. A rubber composition comprising:
   a. a rubber, and
   b. a polymer nano-particle including a poly(alkenylbenzene) core and at least two additional layers independently including monomer units selected from the group consisting of conjugated dienes, alkylenes, alkenylbenzene, acrylates, nitrites, and mixtures thereof.

15. The composition of claim 14 further including an extender.

16. The composition of claim 14 wherein said rubber is selected from the group consisting of random styrene/butadiene copolmers, butadiene rubber, polyisoprene, nitrile rubber, polyurethane, butyl rubber, EPDM, and mixtures thereof.

17. The composition of claim 14 wherein said polymer nano-particle further includes a functional group selected from the group consisting of carboxylic acids, alcohols, amines, formyl, tin, silica, and mixtures thereof.

18. The composition of claim 14 wherein at least one of two additional said layers is a copolymer layer.

19. The composition of claim 14 wherein said rubber further includes silica.

20. A hard disk drive composition comprising the rubber composition of claim 14.

21. A thermoplastic gel comprising the rubber composition of claim 14.

22. An engineering plastic comprising the rubber composition of claim 14.

23. An engine mount comprising the rubber composition of claim 14.

24. A process for forming a composition comprising:
forming the multi-layer nanoparticle of claim 1;
adding the multi-layer nanoparticle to a vulcanizable elastomeric composition.

25. The composition of claim 14 wherein the polymer nano-particle is formed by living anionic polymerization.

* * * * *